(12) United States Patent
Tanaka

(10) Patent No.: US 7,314,069 B2
(45) Date of Patent: Jan. 1, 2008

(54) FUEL CONTAINER, FUEL SUPPLY METHOD, FUEL FILLING METHOD, AND FUEL CELL SYSTEM

(75) Inventor: Shuya Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 11/005,072

(22) Filed: Dec. 6, 2004

(65) Prior Publication Data

US 2005/0189035 A1  Sep. 1, 2005

(30) Foreign Application Priority Data

Dec. 11, 2003 (JP) ............................. 2003-413147

(51) Int. Cl.
B65B 1/04 (2006.01)

(52) U.S. Cl. .................... 141/94; 700/241; 700/244; 705/14; 705/26

(58) Field of Classification Search .................. 141/94, 141/192, 83, 98; 700/241, 244; 705/14, 705/26
See application file for complete search history.

(56) References Cited

U.S. PATENT DOCUMENTS

| 4,263,945 | A  | * | 4/1981  | Van Ness ..................... 141/98 |
| 5,913,344 | A  | * | 6/1999  | Wronski et al. ............... 141/83 |
| 6,574,603 | B1 | * | 6/2003  | Dickson et al. ................ 705/1 |
| 6,813,609 | B2 | * | 11/2004 | Wilson ........................ 705/14 |
| 6,897,374 | B2 | * | 5/2005  | Garber et al. ................. 174/47 |
| 7,020,541 | B2 | * | 3/2006  | Wilson ....................... 700/223 |

FOREIGN PATENT DOCUMENTS

| JP | 2002-093442 A | 3/2002  |
| JP | 2003-303609 A | 10/2003 |

* cited by examiner

Primary Examiner—Steven O. Douglas

(57) ABSTRACT

A fuel cartridge includes a fuel tank which stores fuel to be supplied to a fuel cell of a main device, and a storage unit which stores information on type of fuel, remaining amount of fuel in the fuel tank, and number of times the fuel tank has been used. The fuel cartridge is formed separate from the fuel cell.

4 Claims, 7 Drawing Sheets

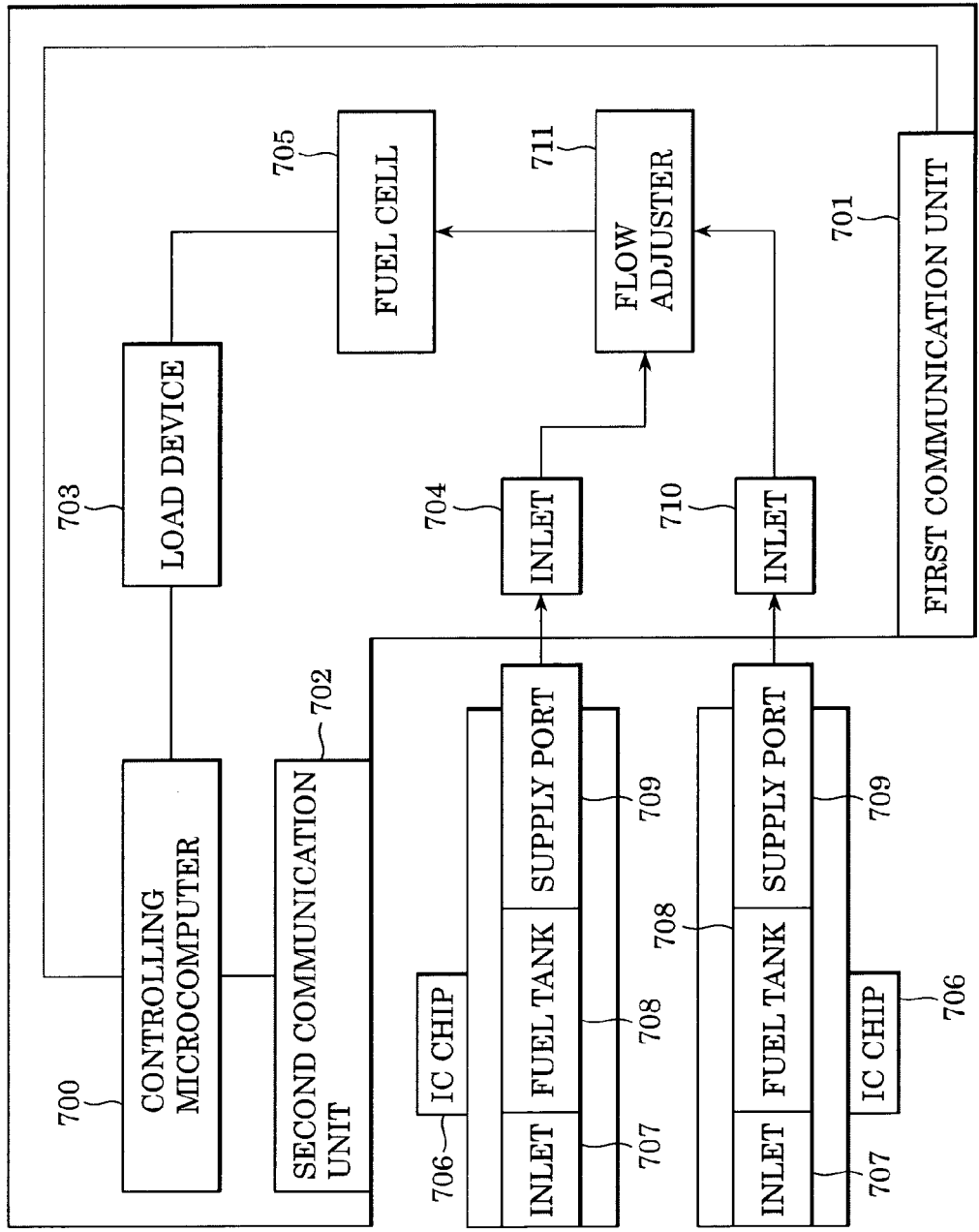

FUEL CONTAINER, FUEL SUPPLY METHOD, FUEL FILLING METHOD, AND FUEL CELL SYSTEM

BACKGROUND OF THE INVENTION

1. Field of the Invention

The present invention relates to a fuel container used with a fuel cell, a method for supplying fuel to a fuel cell, a method for filling the fuel container with fuel, and a fuel cell system, and particularly relates to a fuel cell system applicable to portable devices and the like.

2. Description of the Related Art

Generally, with fuel storage devices and chemical reactors making up fuel cells, a fuel cell unit (modular unit) is formed with a fuel cell integrally combined with the surrounding electric equipment, mounting members, etc., such that the fuel cell unit as a whole is assembled into the apparatus.

Also, a proposal has been made to include a controller in the fuel cell unit for controlling the fuel cell unit. The fuel cell controller is equipped with memory, and stores the temperature, voltage, electric current state, cell capacity, and other like information of the fuel cell unit, in the memory. As of recent, realization of applying fuel cells as the power source for portable devices, such as cameras, PDAs (Personal Digital Assistants), cellular telephones, for example, is imminent.

However, while carrying an extra power source for a portable device as a spare is quite conceivable, in the case of using a fuel cell for the power source of portable devices, carrying an integral module which is inseparable from the related equipment as a spare power source as described above is impractical from the perspective of portability.

Also, conventional arrangements do not enable management information of the fuel cell itself to be obtained or monitored.

SUMMARY OF THE INVENTION

The present invention is directed to a fuel cartridge and fuel cell system with excellent portability in applications to portable devices.

The present invention is also directed to a method for supplying fuel to a fuel cell, a method for filling the fuel container with fuel, and a fuel cell system, whereby information of the entire fuel cell system can be readily managed, having excellent operability, and wherein handling mistakes can be prevented to enable safe use.

According to a first aspect of the present invention, a fuel container includes: a fuel tank adapted to store fuel to be supplied to the fuel cell of the main device; and a storage unit configured to store information, including information on type of fuel, information on remaining amount of fuel in the fuel tank, and information on number of times the fuel tank has been used wherein the fuel container is formed separately from the fuel cell of a main device.

In one embodiment, the fuel container further includes: a connection portion detachably connected to the main device; a supply port facilitating supplying the fuel from the fuel tank to the fuel cell; and a communication unit wirelessly communicating the information to the main device.

In another embodiment, the fuel container further includes an inlet having a first portion adapted to connect to the supply port, and a second portion configured to inject the fuel into the fuel tank.

According to a second aspect of the present invention, a method of supplying fuel to a main device having a fuel cell mounted thereto includes: a step of connecting a fuel container storing fuel to the main device having the fuel cell; a step of wirelessly communicating, between the main device and the fuel container, information of at least one of type of fuel, remaining amount of fuel in the fuel tank, and number of times the fuel tank has been used; and a step of determining whether to supply the fuel from the fuel container to the fuel cell based on the information wirelessly communicated in the wireless communication step.

Supplying of the fuel to the fuel cell may be permitted in the event that determination is made in the determining step that the type of the fuel is acceptable to the main device side, or supplying of the fuel to the fuel cell may be permitted in the event that the main device side determines in the determining step that the amount of fuel remaining in the fuel tank is a predetermined amount or more, or further, supplying of the fuel to the fuel cell may be permitted in the event that the main device side determines in the determining step that the number of times of usage of the fuel tank is a predetermined number or less.

The information may include identification information of the fuel tank and identification information of the fuel cell. In another embodiment, the method further includes a step for determining whether to supply the fuel from the fuel container to the fuel cell based on the identification information of both the fuel tank and the fuel cell.

In one embodiment, the connecting step includes a step of connecting a plurality of fuel cartridges, in at least one of parallel and serial with respect to each other, to the main device.

According to a third aspect of the present invention, a fuel filling method includes: a step for connecting a fuel cartridge storing fuel to a fuel filling main unit to which a fuel for filling is loaded; a step for performing wireless communication between the fuel filling main unit and the fuel cartridge regarding information of at least one of type of fuel, remaining amount of fuel in the fuel tank, and number of times the fuel tank has been used; and a step of determining, by the fuel filling main unit, whether to fill the fuel cartridge with the fuel for filling based on the information communicated in the wireless communication step.

Filling of the fuel to the fuel cartridge may be permitted in the event that determination is made in the determining step that the type of the fuel is acceptable to the fuel filling main unit side, or filling of the fuel to the fuel cartridge may be permitted in the event that the fuel filling main unit side determines in the determining step that the amount of fuel remaining in the fuel cartridge is a predetermined amount, or further, filling of the fuel to the fuel cartridge may be permitted in the event that the fuel filling main unit side determines in the determining step that the number of times of usage of the fuel cartridge is a predetermined number.

The information includes identification information of the fuel cartridge and identification information of the fuel for filling. In one embodiment, the method further includes a step of determining by the fuel filling main unit whether to supply the fuel for filling to the fuel cartridge based on the identification information of the fuel cartridge and the fuel for filling.

In one embodiment, the connecting step includes connecting a plurality of fuel cartridges to the fuel filling main unit in parallel or serially.

According to a fourth aspect of the present invention, a fuel cell system includes: a main device having a fuel cell mounted thereto; a fuel container separate from the fuel cell, and including a fuel tank adapted to store the fuel to be supplied to the fuel cell, a storage unit which stores information on at least one of type of fuel, remaining amount of fuel in the fuel tank, and number of times the fuel tank has been used, and a communication unit wirelessly communicating the information to the main device; and a control unit which controls supply of the fuel from the fuel container to the fuel cell based on the information.

The above configuration realizes a fuel cell system with excellent portability for application to portable devices and the like.

As one advantage thereof, non-contact communication between the fuel cartridge side and the main device side prevents ignition due to static electricity.

As another advantage thereof, providing the information storage unit to the fuel cartridge which can be connected to the fuel cell enables the fuel cartridge side of the fuel container to store information relating to the container (remaining amount, number of times filled, fuel used, etc.). Confirming this information of the fuel cartridge at the main unit device side can prevent mistaken use of inappropriate fuel, mounting of different-type or non-conforming fuel cartridges, and use of fuel cartridges beyond the stipulated lifetime thereof. Also, confirming the information of the state of the fuel cartridge at the main device side enables information processing according to the type of fuel cell the fuel cartridge is combined with.

As a further advantage thereof, necessary voltage and electric energy can be obtained by connecting the fuel cartridges either serially or in parallel.

Further features and advantages of the present invention will become apparent from the following description of the embodiments with reference to the attached drawings.

BRIEF DESCRIPTION OF THE DRAWINGS

FIG. 7 is a block diagram illustrating the internal configuration of a load device using a fuel cell system according to a third embodiment of the present invention as a power source thereof, in an arrangement wherein fuel cartridges are connected in parallel.

DESCRIPTION OF THE EMBODIMENTS

First Embodiment

Figure 1:
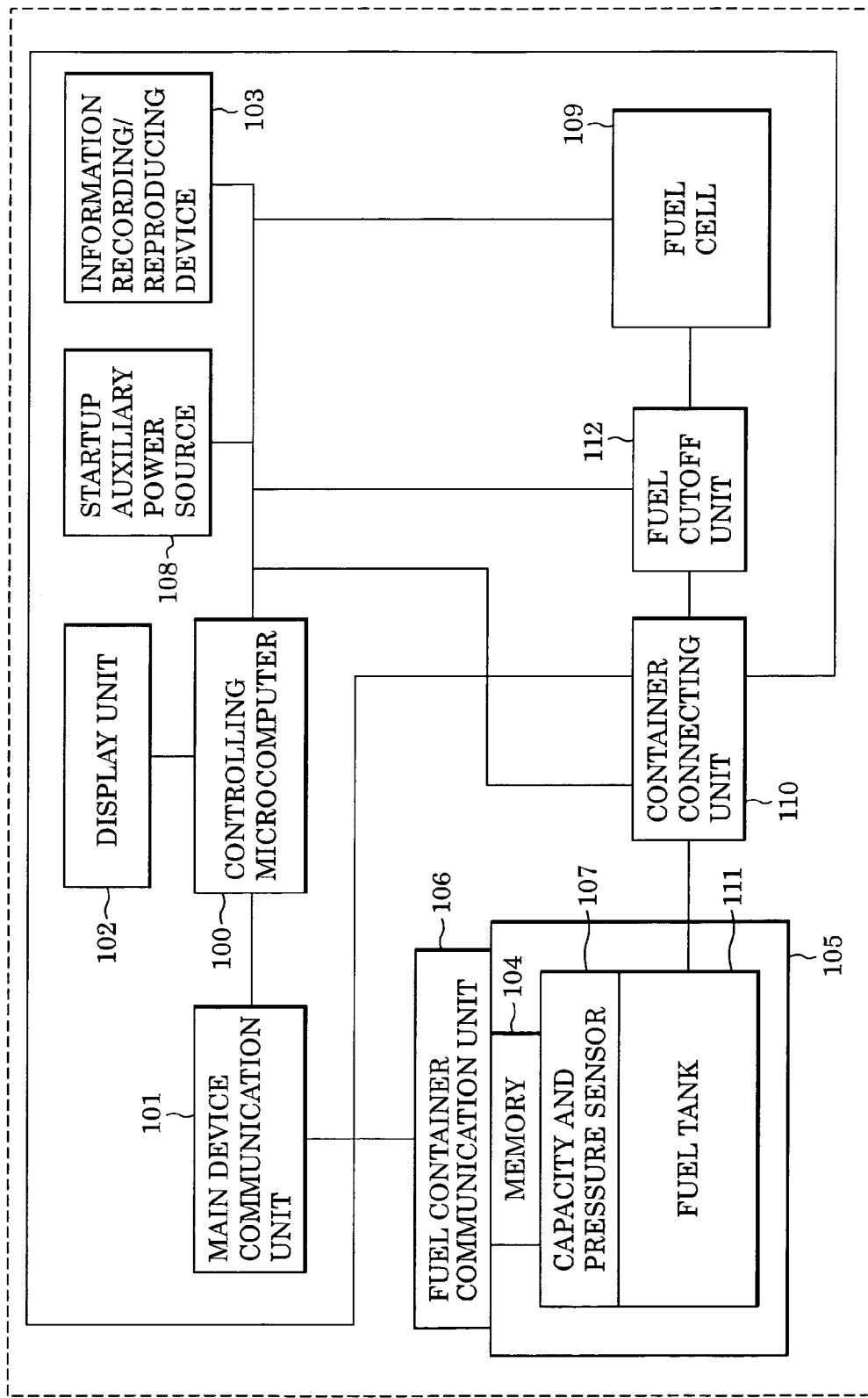
FIG. 1 is a block diagram illustrating the internal configuration of a recording/reproducing device using a fuel cell system according to a first embodiment of the present invention.

FIG. 1 is a block diagram illustrating an internal configuration of a recording/reproducing device using a fuel cell system according to a first embodiment of the present invention as a power source thereof.

A controlling microcomputer (control unit) 100 performs control of a main device communication unit 101, processing according to communication information, display of information on a display unit 102, and control of an information recording/reproducing device 103. A fuel cartridge 105 is capable of storing a fuel tank 111, and includes a connection portion with a container connecting unit 110, memory (storage unit) 104, a capacity and pressure sensor 107, and a fuel cartridge communication unit 106. The memory 104 communicates with the main device communication unit 101 via the fuel cartridge communication unit 106, and stores the communication information thereof and information from the capacity and pressure sensor 107.

The capacity and pressure sensor 107 detects the fuel capacity and pressure within the fuel tank 111. A startup auxiliary power source 108 supplies electric power to the main device communication unit 101, the controlling microcomputer 100, and the display unit 102, before use of a fuel cell 109 is started. The fuel cartridge communication unit 106 is a combination of coil and antenna for wirelessly communicating (non-contact communication) with the main device communication unit 101, using electromagnetic coupling or microwaves. Wireless communication is communication which is performed using spatial propagation of information instead of connecting the two communicating devices with cables or the like, and includes, for example, airwaves, light (particularly infrared), sound, magnetic field, and so forth. Accordingly, the term "non-contact communication" means that there is no electrical connection between the two communicating units, and does not necessarily mean that the two communicating units are not in physical contact.

An example of such a fuel cartridge communication unit 106 is an ISO/IEC 10536 compliant non-contact RFID (Radio Frequency Identification) tag, and IC card, or the like, with electric power being supplied to the memory 104 and capacity and pressure sensor 107. A container connecting unit 110 is a unit for mechanically connecting and detaching the fuel channel of the fuel cartridge 105 and the fuel channel of a main device. A fuel cutoff unit 112 is a unit for supplying or cutting off fuel from the fuel tank 111 to the fuel cell 109.

Figure 2:
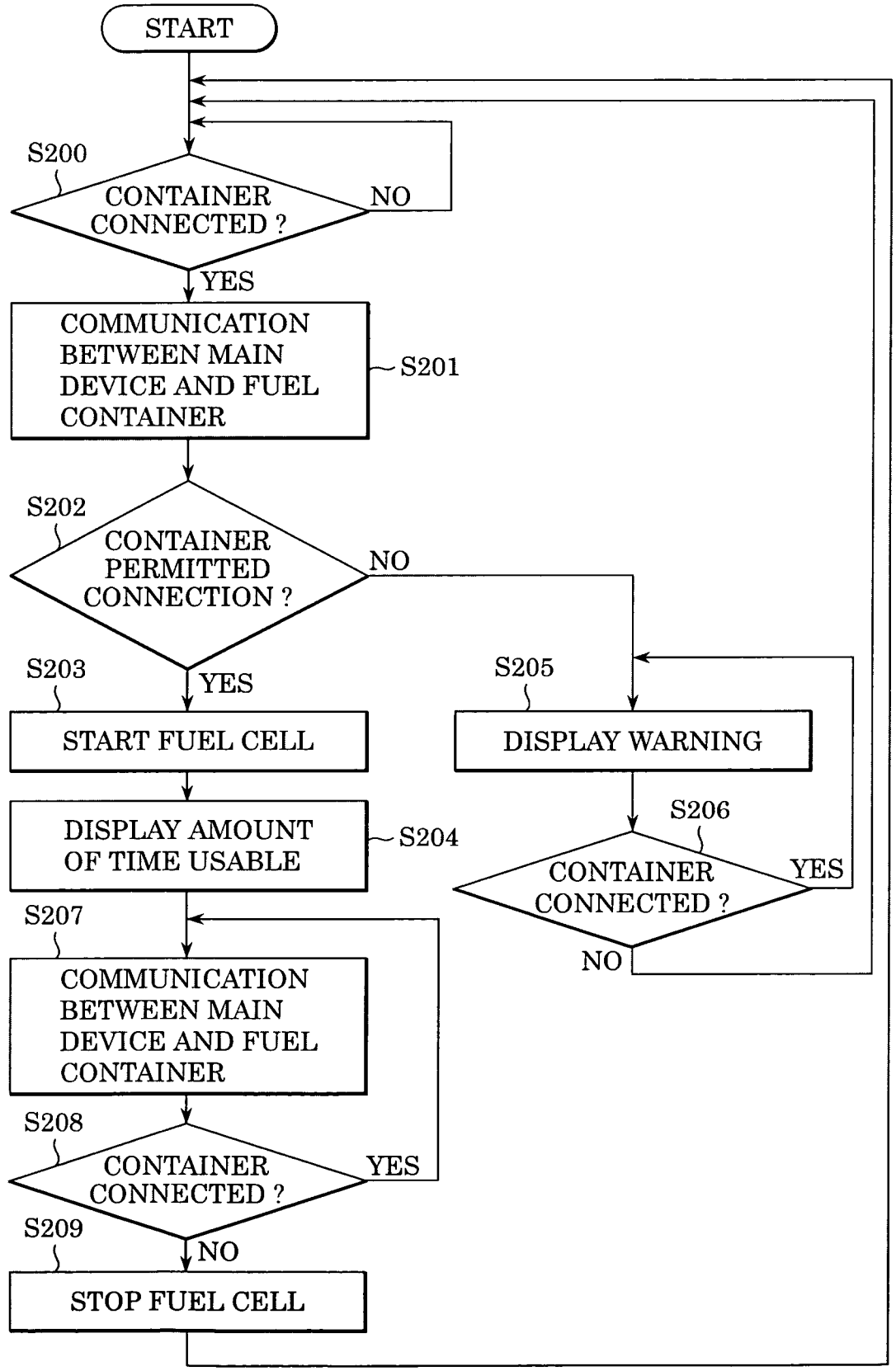
FIG. 2 is a flowchart illustrating the control procedures with a controlling microcomputer shown in FIG. 1.

FIG. 2 is a flowchart illustrating control procedures of the controlling microcomputer 100 shown in FIG. 1. Upon a main device, such as an image-taking device or the like, and the fuel cartridge 105, being connected by the container connecting unit 110, the controlling microcomputer 100 starts up (S200). A connection portion (not shown) at the side of the fuel cartridge 105 is connected to the container connecting unit 110. This connection portion realizing mechanical connection of the fuel cartridge 105 to the main device, and connection of a channel for guiding fuel from the fuel tank 111 to the fuel cell 109. In step S201, communication is started by the controlling microcomputer 100 between the main device communication unit 101 and the fuel container communication unit 106. The controlling microcomputer 100 reads individual identification information from the memory 104. The identification information is for identifying whether or not the fuel cartridge 105 can be mounted to the main device and used. Information is recorded for containers which satisfy predetermined safety regulations, such as regarding filling flammable liquids or combustible gases, to the effect that the container is a standard-compliant container.

In step S202, determination is made regarding whether or not the fuel cartridge 105 is a connection-permitted container which has been permitted to be mounted to the main device and used. In the event that the fuel cartridge 105 is a connection-permitted container, the flow proceeds to step S203, the action of the fuel cutoff unit 112 is disabled, and fuel is supplied so as to start running the fuel cell 109. In the event that the fuel cartridge 105 is not a connection-permitted container, the flow proceeds to step S205, wherein the display unit 102 displays a warning, prompting the user to replace the fuel cartridge 105 with another fuel cartridge. In this case, the action of the fuel cutoff unit 112 is not disabled, and the flow stands by until the fuel cartridge 105 is removed at the container connecting unit 110 (S206). Once the fuel cartridge 105 is removed, the flow returns to the initial state in step S200.

In step S204, the controlling microcomputer 100 reads data regarding the amount of fuel remaining in the fuel tank 111 and the pressure thereof, and data regarding the type of fuel filled therein, which is stored in the memory 104, via the main device communication unit 101 and the fuel container communication unit 106. The controlling microcomputer 100 then calculates the amount of time which the fuel cell can still operate, based on the data regarding the type of fuel filled (e.g., methyl alcohol), concentration (%), amount remaining (ml) and pressure (Pa), and also the voltage (V) generated at the fuel cell at the main device side and the power consumption (W) of the information recording/reproducing device. This calculated time is displayed on the display unit 102 as the amount of time which the fuel cell can be used. Further, cartridge container information may be displayed besides the time, such as the type of fuel, amount of fuel remaining within the fuel tank, the number of times which the fuel tank has been used, and so forth. In addition, the resistance and voltage values at the initial state may be stored, and periodically detected to obtain and display the information about polarization and diffusion states.

In steps S207 and S208, the fuel cartridge communication unit 106 continues non-contact communication with the main device communication unit 101 until removed at the container connecting unit 110, and the memory 104 stores the newest detected data from the capacity and pressure sensor 107. In step S209, fuel is cut off by the fuel cutoff unit 112, the fuel cell 109 stops operating, and the flow returns to the initial state in step S200.

Further, a temperature sensor may be provided besides the pressure sensor to detect temperature within the fuel tank, so as to detect abnormalities and improve safety.

As described above, providing memory to a fuel cartridge enables the container side to store related information within the container (amount of fuel remaining, number of times filled, fuel used, etc.) even if the fuel cartridge is replaced. Accordingly, one advantage thereof is that information processing can be performed according to the specifications (voltage generated and power consumption) of the main device including the fuel cell. Also, having no electrical connection is advantageous in avoiding igniting flammable liquids or combustible gases due to static electricity. A further advantage is that supply of fuel from unknown fuel cartridges which the main device does not permit can be prevented, since fuel is sent to the fuel cell following confirmation of connection permission between the fuel cartridge and the main device.

Second Embodiment

Figure 3:
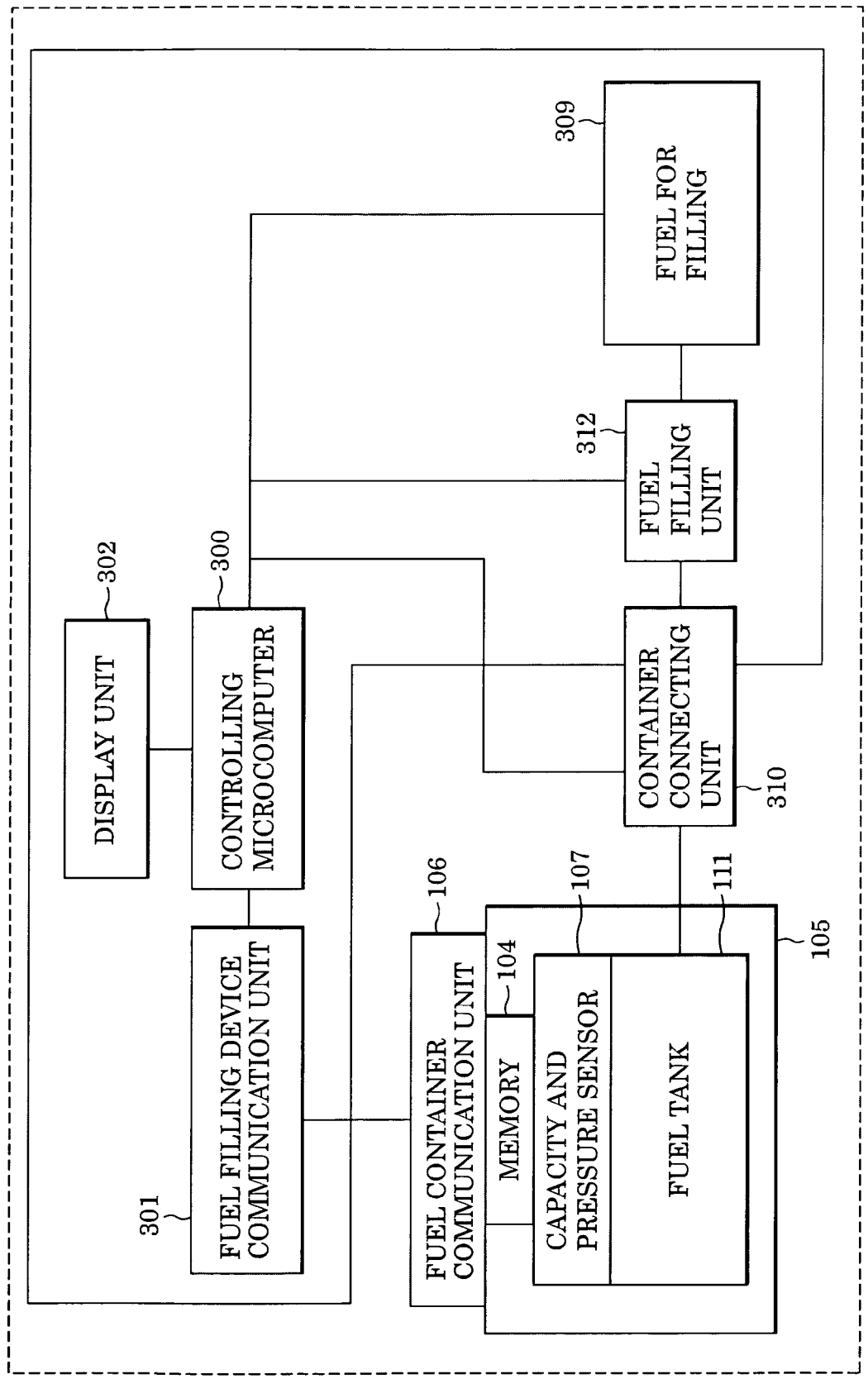
FIG. 3 is a block diagram illustrating the internal configuration of a fuel filling device using a fuel cell system according to a second embodiment of the present invention.

FIG. 3 is a block diagram illustrating the internal configuration of a fuel filling device using a fuel cell system according to a second embodiment of the present invention.

A controlling microcomputer (control unit) 300 performs control of a fuel filling device communication unit 301, processing according to communication information, and display of information on a display unit 302. The memory 104 is provided to the fuel cartridge 105 and communicates with the fuel filling device communication unit 301 via the fuel container communication unit 106, and stores the communication information thereof and information from the capacity and pressure sensor 107. The fuel container communication unit 106 is a combination of coil and antenna for non-contact communication with the fuel filling device communication unit 301, using electromagnetic coupling or microwaves, with electric power being supplied to the memory 104 and the capacity and pressure sensor 107. A container connecting unit 310 is a unit for mechanically connecting and detaching the fuel channel of the fuel cartridge 105 and the fuel channel of the fuel filling device. A fuel filling unit 312 is a unit for supplying or cutting off fuel for filling 309 to the fuel tank 111.

Figure 4:
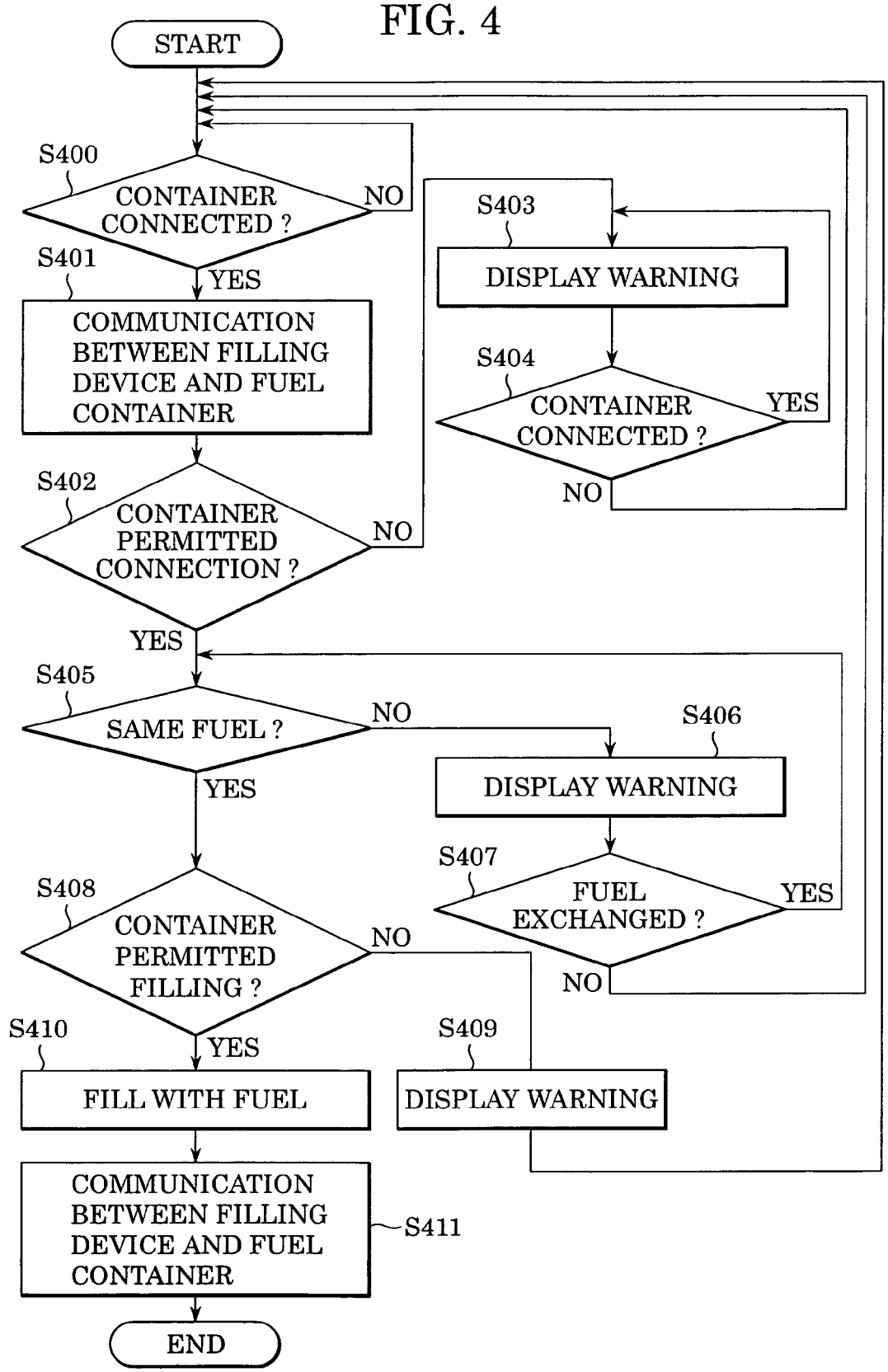
FIG. 4 is a flowchart illustrating the control procedures with a controlling microcomputer shown in FIG. 3.

FIG. 4 is a flowchart illustrating control procedures of the controlling microcomputer 300 shown in FIG. 3. Upon the filling device and the fuel cartridge 105 being connected by the container connecting unit 110, the controlling microcomputer 300 starts up (S400). In step S401, communication is started by the controlling microcomputer 300 between the fuel filling device communication unit 301 and the fuel container communication unit 106. The controlling microcomputer 300 reads individual identification information from the memory 104. The individual identification information is for identifying whether or not the fuel cartridge 105 can be mounted to the main device and used. Information is recorded for containers which satisfy predetermined safety regulations, such as regarding filling flammable liquids or combustible gases, to the effect that the container is a standard-compliant container.

In step S402, determination is made regarding whether or not the fuel cartridge 105 is a connection-permitted container which has been permitted to be mounted to the main device and used. In the event that the fuel cartridge 105 is not a connection-permitted container, the flow proceeds to step S403, wherein the display unit 302 displays a warning, prompting the user to replace the fuel cartridge 105 with another fuel cartridge. In this case, the flow stands by until the fuel cartridge 105 is removed (S404). Once the fuel cartridge 105 is removed, the flow returns to the initial state in step S400.

In the event that the fuel cartridge 105 is a connection-permitted container, the flow proceeds to step S405, where the controlling microcomputer 300 reads the data regarding the type of fuel already filled in the fuel tank 111, which is stored in the memory 104, and in the event that the container is not empty and is filled with a predetermined amount or more capable of filling the fuel cell, determination is made regarding whether or not the fuel is the same as the fuel for filling 309 in the filling device.

In the event that the type of concentration of the fuel in the fuel cartridge 105 is different to that of the fuel for filling 309, the flow proceeds to step S406 where a warning is displayed to prompt the user to replace the fuel for filling 309. At step S407, it is determined whether the fuel for filling 309 has been exchanged. In the event that the fuel for filling 309 is replaced following the warning, the flow returns to step S405, otherwise, the flow returns to step S400.

No fuel is filled until one or the other of the fuel for filling 309 and the fuel cartridge 105 is replaced so that the concentration and type of fuel of both are the same, or until the fuel cartridge 105 is replaced with an empty cartridge 105. In step S405, in the event that fuel of the same concentration and type is filled to a predetermined amount of more, the flow proceeds to step S408, where determination is made regarding whether or not the fuel cartridge 105 is within a number of usage times or usage period wherein refilling is permissible from the perspective of durability. In the event that the life period of the fuel cartridge 105 has expired, the flow proceeds to the processing in step S409, a warning is issued, and the flow proceeds to the initial state in step S400. Otherwise, the flow proceeds to the processing in step S410, and the fuel filling unit 312 fills the cartridge 105 with the fuel for filling 309. Next, the fuel filling device communication unit 301 and the container communication unit 106 communicate with each other, thereby updating usage fuel type data and the number of times of filling (S411).

Figure 5:
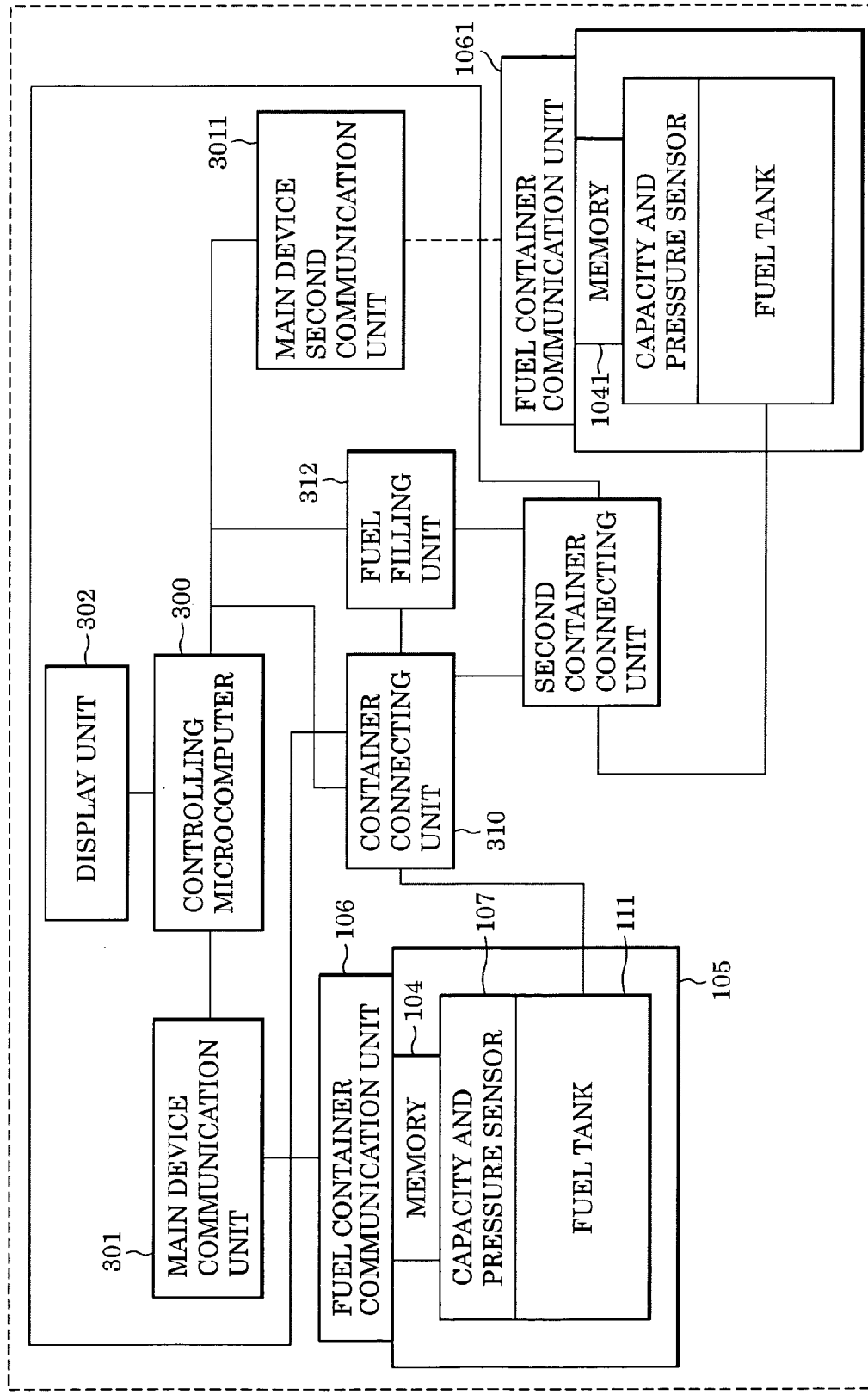
FIG. 5 is a block diagram illustrating another example of a fuel filling device.

FIG. 5 is a block diagram illustrating another example of a fuel filling device using the fuel cell system. With the fuel filling device shown in FIG. 5, the fuel for filling 309 shown in FIG. 3 has an external container configuration, the same as with the fuel cartridge 105.

In the event of transferring the fuel, confirmation is made that the fuel type data in the memory 104 obtained from a fuel container communication unit 106 and the fuel type data in a memory 1041 obtained from a main device second communication unit 3011 match, and in the event that these do not agree, the controlling microcomputer 300 prohibits transferring of the fuel.

As described above, providing an information storage unit to the fuel cartridge enables the container side to store related information within the container (amount of fuel remaining, number of times filled, fuel used, etc.) even if the fuel cartridge is replaced. Accordingly, one advantage thereof is that accidents wherein different types of fuel are mixed at the time of refilling the fuel cartridge can be prevented. Also, the fuel is filled after confirming the durability information of the fuel cartridge, yielding an advantage in that accidents of the container rupturing due to filling an old container with fuel can be prevented.

Third Embodiment

Figure 6:
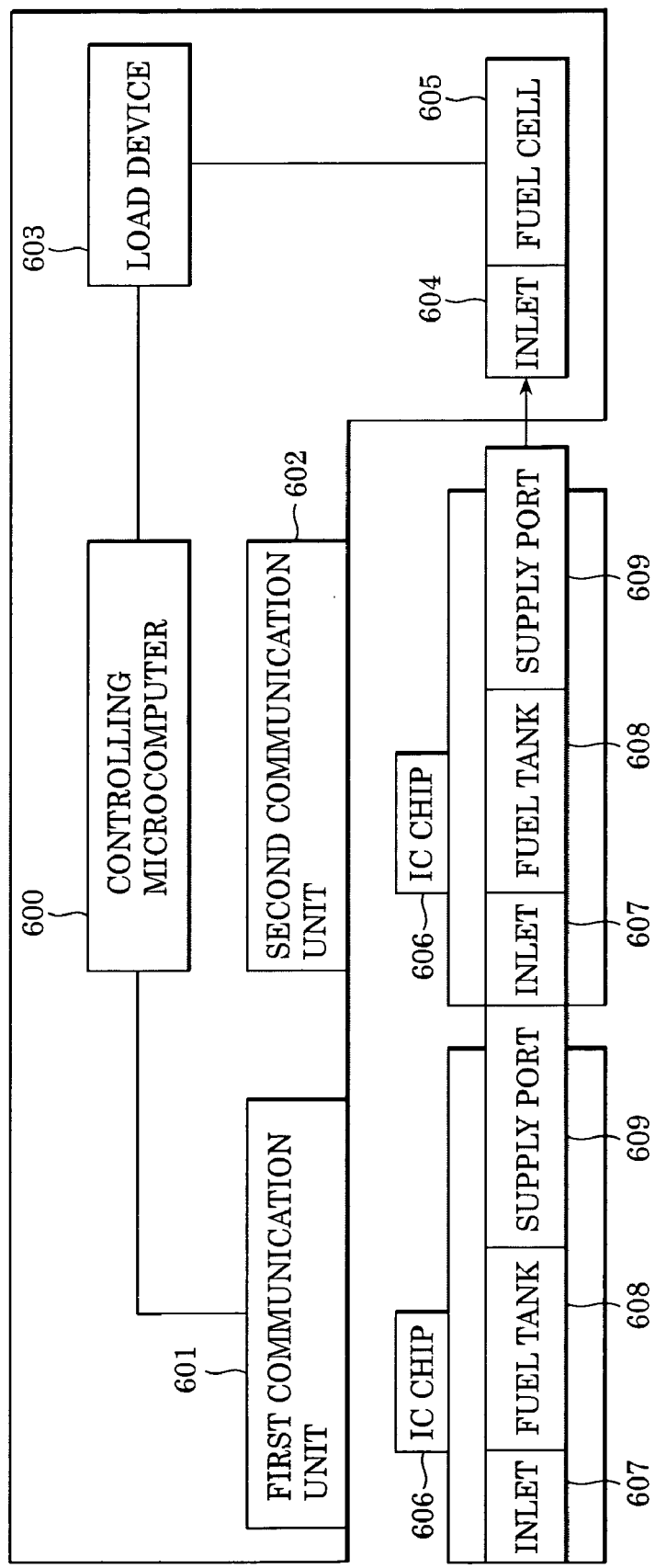
FIG. 6 is a block diagram illustrating the internal configuration of a load device using a fuel cell system according to a third embodiment of the present invention as a power source thereof, in an arrangement wherein fuel cartridges are connected serially.

FIGS. 6 and 7 are block diagrams illustrating the internal configuration of a load device using a fuel cell system as the power source thereof, according to a third embodiment of the present invention. In FIG. 6, a controlling microcomputer 600 performs non-contact communication with an IC chip 606 of fuel cartridges by a first communication unit 601 and a second communicating unit 602. The fuel cartridges are filled with fuel from an inlet 607 of the fuel cartridge, and the fuel is stored in a fuel tank 608. The fuel within the fuel tank 608 is discharged from a supply port 609.

With the system shown in FIG. 6, the fuel cartridges are connected serially. While only two fuel cartridges are shown in the drawing, a greater number of fuel cartridges can be connected serially. The supply port 609 of the last fuel cartridge (left in the drawing) and the inlet 607 of the adjacent fuel cartridge are connected, so as to use as an integrated fuel cartridge. The supply port 609 of the front-most fuel cartridge (right in the drawing) is connected to the main device side inlet 604, and fuel is supplied to a fuel cell 605, thereby generating electricity for driving a load device 603. In this case as well, the supply port 609 for connecting to the inlet 607 is just one, so the flow of fuel and the voltage generated remains the same, but the greater the number of fuel cartridges are connected, the more fuel the overall fuel cartridge can store, meaning that the battery can be used for a longer time.

In FIG. 7, a controlling microcomputer 700 performs non-contact communication with an IC chip 706 of fuel cartridges by a first communicating unit 701 and a second communicating unit 702. The fuel cartridges are filled with fuel from an inlet 707 of the fuel cartridge, and the fuel is stored in a fuel tank 708. The fuel within the fuel tank 708 is discharged from a supply port 709.

With the system shown in FIG. 7, the fuel cartridges are connected in parallel. While only two fuel cartridges are shown in the drawing, a greater number of fuel cartridges can be connected in parallel. The supply ports 709 of the fuel cartridges and inlets 704 and 710 on the main device side are each connected, and the flow of fuel is adjusted to a constant flow, and then the fuel is supplied to a fuel cell 705 by a flow adjuster 711, thereby generating electricity for driving a load device 703.

In this case, there is more than one supply port and inlet, so the flow can be made greater than with the case wherein there is only one fuel cartridge. Accordingly, the number of fuel cells 705 can be increased and the voltage generated can be increased. The greater the number of containers connected in parallel, the more fuel can be discharged at once, and accordingly the greater the load that can be handled.

As described above, providing a fuel inlet and a fuel supply port separately on fuel cartridges enables the fuel cartridges to be arranged serially or in parallel, so that either the same amount of flow as with one fuel cartridge can be provided for a longer time, meaning the same voltage is generated for a longer time, or more fuel can be provided at once, meaning that higher voltage can be generated.

The present invention can also be achieved by providing a storage medium storing program codes for performing the aforesaid processes to an image sensing system or apparatus, reading the program codes, by a CPU or MPU of the image sensing system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network) can be used for providing the program codes.

Furthermore, besides aforesaid functions according to the above embodiments are realized by executing the program codes which are read by a CPU of the image sensing system or apparatus, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image sensing system or apparatus or in a memory provided in a function expansion unit which is connected to the image sensing system or apparatus, CPU or the like contained in the function expansion card or unit performs a part or entire process in accordance with designations of the program codes and realizes the functions of the above embodiments.

In a case where the present invention is applied to the aforesaid storage medium, the storage medium stores program codes corresponding to the flowchart of FIG. 2 or 4 described in the embodiments.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-413147 filed Dec. 11, 2003, which is hereby incorporated by reference herein.

What is claimed is:

1. A fuel cell system comprising:
   a portable device having a fuel cell unit mounted thereto and driven electrically by the fuel cell unit;
   a fuel container separate from the portable device, the fuel container comprising:
   a fuel tank adapted to store the fuel to be supplied to the fuel cell unit of the portable device;
   a storage unit configured to store information on at least one of type of fuel, remaining amount of fuel in the fuel tank, and number of times the fuel tank has been used; and
   a communication unit wirelessly communicating the information to the portable device; and
   a control unit controlling supply of the fuel from the fuel container to the fuel cell unit based on the information.

2. A fuel container supplying fuel to a fuel cell unit, the fuel container comprising:
   a fuel tank adapted to store the fuel to be supplied to the fuel cell unit;
   a connection portion detachably connected to a portable device driven electrically by the fuel cell unit;
   a supply port facilitating supplying the fuel to the fuel cell unit;
   a storage unit configured to store information on at least one of type of fuel, remaining amount of fuel in the fuel tank, and number of times the fuel tank has been used; and
   a wireless communication unit wirelessly communicating the information to the portable device.

3. A method of filling fuel to a fuel container having a fuel tank mounted thereto, comprising:
   when the fuel container is connected to a fuel filling unit loading a fuel for filling, sending to the fuel filling unit, via a wireless communication unit mounted to a fuel container, from among information stored in a storage unit mounted to the fuel container, information on at least one of type of fuel, remaining amount of fuel in the fuel tank, and number of times the fuel tank has been used;
   receiving, via a wireless communication unit mounted to the fuel filling unit, the information sent in the sending step; and
   determining, via a control unit mounted in the fuel filling unit, whether to supply the fuel from the fuel filling unit to the fuel cell container, based on the information received in the receiving step,
   wherein the determining step includes determining whether an amount of fuel remaining in the fuel tank is a predetermined amount or less, and
   responsive to determining that the amount of fuel remaining in the fuel tank is the predetermined amount or less, filling the fuel tank with the fuel for filling.

4. A method of filling fuel to a fuel container having a fuel tank mounted thereto, comprising:
   when the fuel container is connected to a fuel filling unit loading a fuel for filling, sending to the fuel filling unit, via a wireless communication unit mounted to a fuel container, from among information stored in a storage unit mounted to the fuel container, information on at least one of type of fuel, remaining amount of fuel in the fuel tank, and number of times the fuel tank has been used;
   receiving, via a wireless communication unit mounted to the fuel filling unit, the information sent in the sending step; and
   determining, via a control unit mounted in the fuel filling unit, whether to supply the fuel from the fuel filling unit to the fuel cell container, based on the information received in the receiving step,
   wherein the determining step includes determining whether a number of usage of the fuel tank is a predetermined number or less, and
   responsive to determining that the number of usage is the predetermined number or less, filling the fuel tank with the fuel for filling.

* * * * *